Dec. 8, 1936.  H. R. GEER  2,063,497

APPARATUS FOR MAKING WELDING ELECTRODES

Filed June 20, 1935  2 Sheets-Sheet 1

Inventor
Harry R. Geer
By R. S. A. Dougherty
Attorney

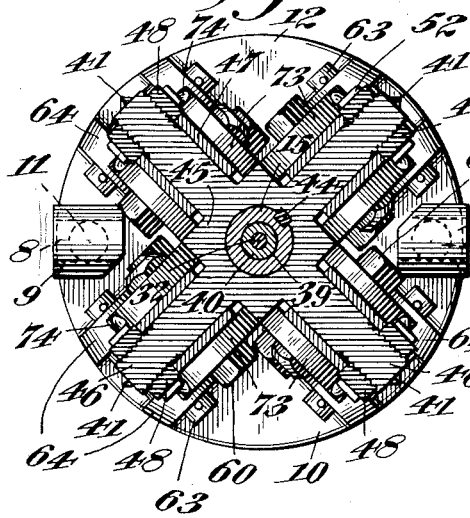
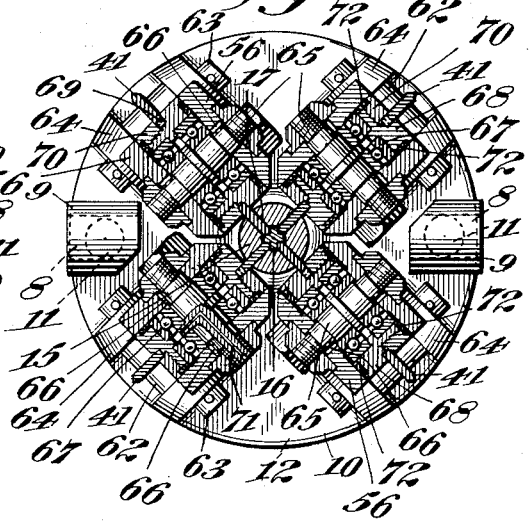
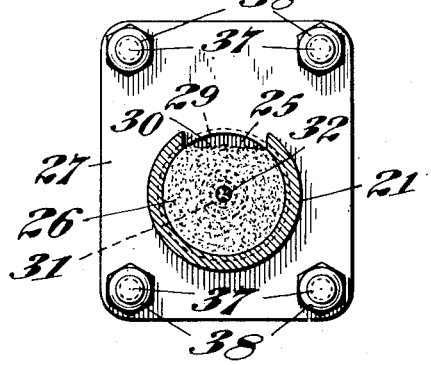
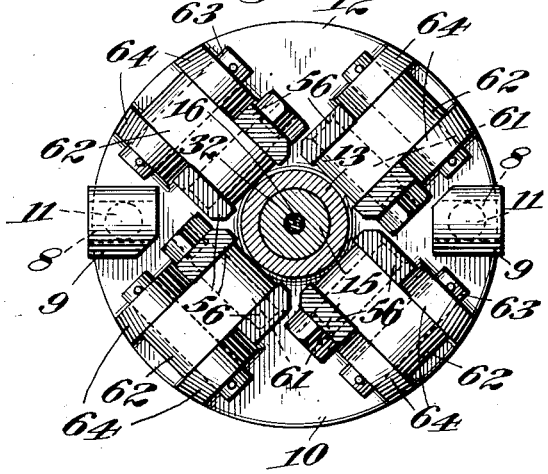

Patented Dec. 8, 1936

2,063,497

UNITED STATES PATENT OFFICE 2,063,497

APPARATUS FOR MAKING WELDING ELECTRODES

Harry R. Geer, Westmont, Pa., assignor to Bethlehem Steel Company, a corporation of Pennsylvania Application June 20, 1935, Serial No. 27,507

36 Claims. (Cl. 29—33)

My invention relates to improvements in apparatus for manufacturing electrodes for use in electric arc-welding, and more especially to a machine for producing wire or rod electrodes provided with a welding flux or arc-sustaining material incorporated therewith for the purpose of stabilizing the arc and preventing the inclusion of deleterious materials, and having characteristics advantageous for either hand or automatic arc welding.

In order to simplify the description herein I will refer to the stock material from which the electrode is formed, as a rod, but I wish it understood that this would apply to a wire or bar or the like stock material that could be operated on in a similar manner.

One of the objects of my invention relates to the manner of guiding the advancing rod in forming the electrodes between cutting or grooving rolls adapted to produce longitudinal grooves therein.

Another object of my invention is to provide means for adjusting the cutting rolls to vary the depth of the grooves formed in the rod.

Another object of my invention relates to the manner of simultaneously swinging the cutting rolls laterally out of the path of the rod through the machine, so that the rod may be quickly inserted between the cutting rolls before initially starting the grooving, flux applying and drawing operations.

Another object of my invention relates to the manner of pivotally mounting the cutting rolls in opposed relation to each other in such a way that they can be individually or collectively adjusted.

A further object of my invention is to provide means for disposing fluxing material in the longitudinal grooves formed in the rod and then drawing the rod through a die to compress the fluxing material in the longitudinal grooves and to slightly reduce the size of the rod and the width of the grooves thereby removing any irregularities in the surface of the electrode so it may be bent or otherwise roughly handled without dislodging the fluxing material.

Other objects will appear hereafter.

Referring now to the accompanying two sheets of drawings which form a part of this specification and on which like characters of reference indicate like parts:—

Figure 4 is a vertical section through the cruciform adjusting support taken on the line 4—4 of Fig. 2.

Figure 5 is a vertical transverse section through the center of the cutting rolls, taken on the line 5—5 of Fig. 2.

Figure 6 is a vertical transverse section through the flux box taken on the line 6—6 of Fig. 2.

Figure 7 is a vertical transverse section taken on the line 7—7 of Figure 2 illustrating the manner of attaching the inner ends of the links for supporting the cutting rolls to the sliding spider, and Fig. 8 is a detail section through one of the arms of the cruciform support and the adjusting block mounted thereon, taken on the line 8—8 of Fig. 2.

Figure 1:
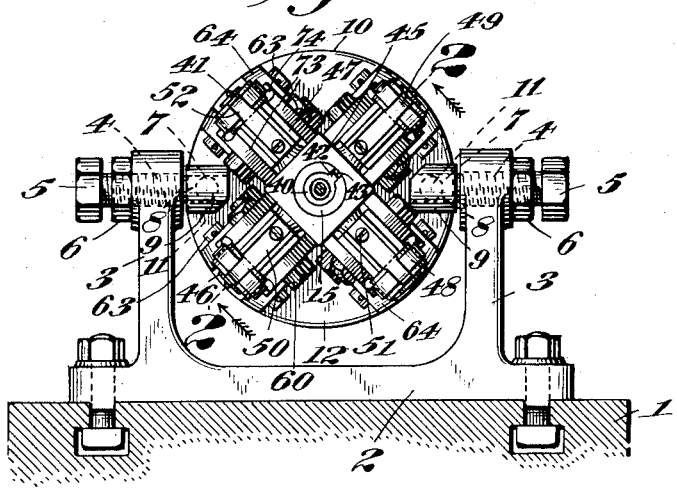
Figure 1 is a front end elevation of my invention and illustrating a portion of a drawing bench or the like upon which it is mounted.

With my invention the rod is drawn between the cutting rolls, flux box and die box in the direction indicated by the arrow, by any suitable rod or wire drawing bench mechanism provided with a stock reel from which the rod stock is received and fed through my improved machine by means of a drawing block adapted to receive and coil the finished electrode, from which point it may be shipped and sold in coils for use in automatic arc welding machines, or cut into straight pieces of the desired lengths and assembled and tied up in bundles of convenient sizes for handling, adapted for use in hand welding machines.

Referring now to the various characters of reference on the drawings:—A drawing bench or the like is indicated at 1, upon which is mounted and secured a support 2, provided with upwardly extending spaced arms 3, each formed with a threaded perforation 4, at their upper ends for receiving adjustable bolts 5, which are held in position by means of lock nuts 6, and provided with trunnion projections 7, adapted for swivel engagement with the eyes 8 of bracket arms 9, which project from opposite sides of the front of a spider 10, said bracket arms 9 being riveted to the spider 10 as at 11.

The spider 10 is adapted to support the machine and is provided with an annular body portion 12 provided with a central forwardly extending tubular portion 13, formed with kerfs at its outer end as at 14 adapted to support a centering sleeve 15, having a longitudinally extending tubular guideway 16, and slots 17, in alignment and registering with the kerfs 14. A boss 18 extends rearwardly from the central rear portion of the annular body portion 12 of the spider and is provided with a socket 19, for receiving the forward closed end 20, of a tubular flux box 21, which is keyed to the rear reduced end 23 of the centering sleeve 15 as at 22, and to the boss 18, and is further held in position on the centering sleeve 15 by means of a nut 24.

The tubular flux box 21 is open at the top as at 25 for inserting the flux material 26, its rear end being formed with a laterally extending flange 27 which is perforated as at 28 and recessed as at 29 for receiving a guide ring 30, said guide ring 30 being perforated centrally as at 31 for guiding the rod 32 to the forming opening 33 in the die block 34 for compressing the flux material and removing irregularities in the surface of the rod to form the finished electrode 35.

The die block 34 is removable to allow for replacement or for different sized openings, the dies being held in position by means of a clamp plate 36 which is connected to the laterally extending flange 27 at the rear of the flux box by means of bolts 37 which have their ends threaded and passed through the perforations 28 and secured in position by means of nuts 38.

The forward end of the centering sleeve 15 is counter-bored as at 39, to form a socket for the reception of a tubular shaped guide 40, for receiving and guiding the rod 32 to the cutting rolls 41, said guide 40 being preferably notched at its rear end for the passage of the edges of the cutting rolls 41, and flanged and formed with a key at its outer end as at 42 to engage a radial groove 43 formed in the front end of the centering sleeve 15. This tubular shaped guide 40 is removable to allow for replacement or for guiding different sized rods.

Keyed at 44 to the other end of the centering sleeve 15, is an adjusting support of cruciform shape having a square central portion 45 with radially extending arms 46, formed integral therewith. An adjusting block 47 is slidably mounted on each of the arms 46, each of said adjusting blocks 47 being held in position by means of a nut 48, threaded on the outer end of each of the arms 46. A locking spring 49 is seated in a vertical groove 50 in the front face of each adjusting block 47, and secured thereto by means of a set screw 51. The upwardly extending end of each of the springs being adapted to engage one of a plurality of vertical grooves 52, formed in the side surface of the nut 48 to hold the nuts in their adjusted positions. The rear side of each of the adjusting blocks 47 has a vertical kerf 53, formed therein for the passage of the circumferential portions of the cutting rolls 41, and are each perforated transversely as at 54 for receiving a pin 55, which has its outer extending ends secured to a pair of spaced supporting links 56, for the cutting rolls 41, and forms the pivotal points for their forward ends. The pins 55 are grooved centrally on opposite surfaces as at 57 and 58 for the passage of the circumferential portions of the cutting rolls 41 and the extending arms 46 of the adjusting support respectively. One of the ends of each of the pins 55 is riveted as at 59 to one of the supporting links for said cutting rolls, while the other end is threaded and has a nut 60 threaded thereon as indicated more clearly in Figure 8 of the drawings.

The rear end of each pair of supporting links 56 for the cutting rolls 41 is pivoted in a similar manner as the forward ends by means of a pin 61, to a connecting link 62 which is pivoted by means of a pin as at 63 to a pair of ears 64 extending from the front face of the spider 10.

As indicated in the drawings four cutting rolls 41 disposed at right angles to each other are adapted to form equi-spaced longitudinal grooves in the rod. Each groove being formed at 90° of its axis, but a greater or less number of cutting rolls 41 may be used to form the grooves if desired.

An axle 65 has its ends mounted and preferably keyed as at 66 to each pair of the spaced supporting links 56, said axles being provided between each pair of supporting links with roller bearings 67 for supporting a hub 68 for the cutting rolls 41 which is keyed thereto as at 69, and held in position by means of a ring nut 70. As the axles 65 are each provided with an oil duct 71 for supplying oil or lubricant to the roller bearings 67 an annular packing ring 72 is seated in a groove on each end of the hubs 68.

In order to hold the cruciform support normally on the forward end of the centering sleeve 15 and the outer ends of the adjusting blocks 47 at all times in contact with the nuts 48, the forward ends of each of the supporting links 56 have a leaf spring 73 secured thereto by means of a set screw 74. The free ends of the springs 73 engaging the rear outer corner edges of the squared central portion 45 of the cruciform support as clearly indicated in Fig. 2 of the drawings. For illustration I have shown the cutting edges of the rolls 41 formed at an angle of 45°. This angle, however, may be varied, and also the depth of the grooves formed in the rod to produce an electrode provided with greater or less flux material. The rod may be subjected to different sized drawing dies to vary the cross-sectional area of the rod after the grooving operation.

Figure 3:
Figure 3 illustrates a plurality of enlarged transverse sections of completed welding rods which may be formed in my machine.

In Fig. 3, four different cross sections of electrodes are shown drawn on an enlarged scale, in which 75 illustrates an electrode with grooves of considerable depth produced by cutting rolls formed with the cutting edges at substantially 45° angles, and then drawn through the flux material and thence through a drawing die for compressing the said flux material and removing irregularities from the surface of the electrode without appreciably reducing its cross sectional area. In the cross section indicated at 76, the grooving and manner of applying the flux material is the same as for 75, but the rod has been passed through a drawing die to considerably reduce its cross sectional area, thereby partially closing the longitudinal grooves to more firmly hold the flux material.

In the cross section indicated at 77, the electrode is formed similar to that described for 75, but the longitudinal grooves are of less depth, and in the cross section 78 the grooves are formed with cutting rolls having substantially 30° cutting edges.

Figure 2:
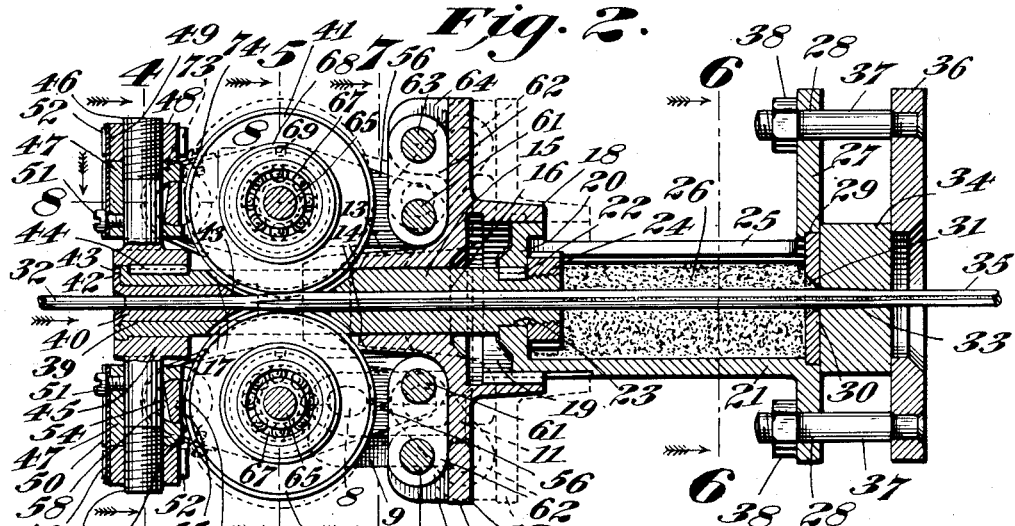
Figure 2 is a longitudinal section of my apparatus detached taken substantially on the line 2—2 of Fig. 1, but drawn on a larger scale.

The operation of my apparatus is as follows:— Assuming that the machine is swivelly mounted on a drawing bench or the like as indicated in Fig. 1, the drawing bench being provided with a suitable reel for holding a coil of rod stock, and a drawing block preferably having a reel for receiving the finished electrode, the parts of the machine being in the position shown in full lines in Fig. 2. The operator slides the spider 10 backward into the position indicated in dotted lines in said figure, thereby swinging the cutting rolls 41 out of the path of the rod as it passes through the machine. The end of the coil of rod stock 32 is then inserted in the guide 40 for the cutting rolls 41 and passed through the tubular guideway 16 in the centering sleeve 15, the flux box 21, guide ring 30, and drawing opening 33 in the die block 34 and thence to the reel on the drawing block (not shown), where it is secured. The operator then slides the spider 10 forward into the full line position at the same time power is applied in the usual manner to the drawing block to rotate the same and pull the rod through the machine in the direction indicated by the arrow in Fig. 2. The cutting rolls 41 will then engage the advancing rod and have a tendency to throw the links 62 to which the rear ends of supporting links 56 are pivoted into vertical position against the outer face of the annular body position 12 of the spdier 10, while the forward ends of the links 56 are pivoted to the slidably mounted blocks 47, which are adjustable and held in position by means of nuts 48 and adapted to adjust the cutting rolls to produce grooves of greater or less depth in the rod, while the leaf spring 73 resiliently holds the forward ends of the links 56 in a raised position against the inner surfaces of the nuts 48 and maintain the cruciform support in its forward position on the centering sleeve 15. After the grooves are formed in the rod it passes through the flux box 21 containing flux material 26, which is preferably in a semi-liquid or plastic condition, although in some cases I may prefer to use flux material in a pulverized or molten state. The grooved rod is then passed through the drawing opening 33 of a die-block 34, where the flux material 26 is compressed in the longitudinal grooves, and the cross sectional area reduced and irregularities removed from the surface of the rod, from thence the finished electrode is received and reeled on the drawing block, where after the run is completed it can be taken off and used in an automatic welding machine or unwound and cut into straight lengths and then assembled in bundles. The operation above described can then be repeated.

Although I have shown and described my invention in considerable detail, I do not wish to be limited to the exact and specific details shown and described, but may use substitutions, modifications or equivalents thereof, as are embraced within the scope of my invention, or as pointed out in the claims.

Having thus described my invention, what I claim as new and desire to secure by Letters Patent is:—

1. A machine for manufacturing flux carrying welding rods, comprising pivotally supported cutting rolls adapted to extrude the metal in forming longitudinal grooves in a cylindrical rod as it is advanced through the machine, a flux containing receptacle through which the rod passes, whereby flux material will be supplied to the grooves, and a drawing die adapted to compress the flux material in said grooves and remove any irregularities in the surface of the rod.

2. A machine for manufacturing flux carrying welding rods in a continuous operation, comprising a plurality of pivotally supported rotating cutting rolls adapted to extrude the metal on opposite sides of their cutting edges in forming a plurality of longitudinal grooves in a cylindrical rod as it is advanced in the machine, means for supplying flux material to the longitudinal grooves, and a drawing die for compressing the flux material in the longitudinal grooves and for removing irregularities in the surface of the rod.

3. A machine for manufacturing flux carrying welding rods, comprising a plurality of pairs of aligned pivotally supported cutting rolls between which a cylindrical rod is drawn to form continuous longitudinal grooves in the peripheral surface of the rod, said cutting rolls adapted to extrude the metal transversely of the rod in forming the grooves, a flux box containing flux material through which the longitudinally grooved rod passes to receive flux material in the grooves, and a drawing die adapted to compress the flux material in the longitudinal grooves and remove irregularities in the surface of the rod.

4. A machine for manufacturing flux carrying welding rods, comprising a plurality of pairs of oppositely aligned pivotally supported cutting rolls for forming continuous longitudinal grooves in the rod as it is continuously advanced through the machine, means for radially adjusting the cutting rolls, resilient means for holding each cutting roll in its adjusted position, a flux box containing flux material through which the rod thus grooved is passed, whereby the flux will enter the longitudinal grooves, and a drawing die for compressing the flux material in the longitudinal grooves and remove any irregularities in the surface of the rod.

5. A machine for manufacturing flux carrying welding rods, comprising a plurality of pairs of oppositely aligned coacting cutting rolls between which the rod is adapted to travel to form continuous longitudinal grooves in the peripheral surface, means for radially adjusting each of the cutting rolls individually, means for radially adjusting all of the cutting rolls simultaneously, a flux box containing flux material through which the rod passes to receive flux material in the longitudinal grooves, and a drawing die for compressing the flux material in the longitudinal grooves and removing irregularities from the surface of the rod.

6. A machine for manufacturing flux carrying welding rods, comprising opposedly arranged coacting rotating cutting rolls adapted to extrude the metal laterally and form continuous longitudinal grooves in the peripheral surface of the rod as it is continuously advanced between the cutting rolls, means for pivotally supporting the cutting rolls, means for applying flux material in the longitudinal grooves, and a drawing die for compressing the flux material in the longitudinal grooves and for removing irregularities from the surface of the rod.

7. A machine for manufacturing flux carrying welding rods, comprising a pair of coacting cutting rolls pivotally supported on the machine for longitudinally grooving a solid cylindrical rod adapted to be continuously advanced through the machine, resilient means for holding the cutting rolls in spaced relation, means for applying flux material in the longitudinal grooves of the continuously advancing rod, and a drawing die for compressing the flux material in the longitudinal grooves and removing irregularities from the surface of the rod.

8. A machine for manufacturing flux carrying welding rod electrodes, comprising a plurality of pairs of pivotally supported cutting rolls for longitudinally grooving a rod adapted to be continuously advanced through the machine, means for simultaneously throwing the cutting rolls radially into or out of the path of the rod as it is advanced through the machine, means for applying and compressing flux material in the longitudinal grooves of the traveling rod, and means for drawing the rod through a die for removing irregularities from the surface of the rod to form the electrode.

9. A machine for manufacturing flux carrying welding rod electrodes in a continuous operation, comprising means pivotally supported for longitudinally grooving a cylindrical rod on a plurality of diametrically opposite surfaces, means for applying flux material in the longitudinal grooves, and means for removing irregularities in the surface of the rod to form the finished electrode.

10. A machine for manufacturing flux carrying welding rod electrodes in a continuous operation, comprising pivotally mounted cutting rolls for longitudinally grooving a cylindrical rod on diametrically opposite surfaces as it is continuously advanced through the machine, resilient means for holding the cutting edges of the rolls in relatively fixed spaced relation, means for applying flux material in the longitudinal grooves thus formed, and a drawing die adapted to continuously compress the flux material in the longitudinal grooves and remove irregularities in the surface of the rod.

11. A machine for manufacturing flux carrying welding rod electrodes in a continuous operation, comprising pivotally supported cutting rolls adapted to form longitudinal grooves in a plurality of diametrically opposite surfaces of the rod as it is advanced through the machine, means for simultaneously throwing the cutting rolls into or out of engagement with the rod, a flux box containing flux material through which the grooved rod passes whereby the said flux material will be supplied to the longitudinal grooves, and a drawing die for compressing the flux material in the grooves and for smoothing the surface of the rod after the preceding operations.

12. A machine for manufacturing flux carrying rod electrodes in a continuous operation, comprising opposed coacting cutting rolls adapted to extrude the metal laterally and form continuous longitudinal grooves in a cylindrical rod as it is continuously advanced through the machine, means for simultaneously throwing the cutting rolls radially into or out of the path of the rod through the machine, means for applying flux material to the longitudinal grooves, and a drawing die adapted to compress the flux material in the grooves and reduce the cross sectional area of the rod to form the finished electrode.

13. A machine for manufacturing flux carrying rod electrodes in a continuous operation, comprising cutting rolls adapted to be rotated by the traveling rod and extrude the metal on each side of the rolls to form longitudinal grooves in said rod as it is continuously advanced through the machine, means for guiding the rod to the cutting rolls, means for simultaneously throwing the cutting rolls radially into or out of the path of the rod through the machine, pivotal means for supporting each of the cutting rolls, a flux box through which the grooved rod passes whereby flux material will be applied to the said longitudinal grooves, and a drawing die adapted to compress the flux material in the longitudinal grooves and reduce the cross sectional area of the rod to form the finished electrode.

14. A machine for manufacturing flux carrying welding rod electrodes in a continuous operation, comprising cutting rolls adapted to be rotated by the rod and form continuous longitudinal grooves therein as it is advanced through the machine, a pair of spaced links for supporting each cutting roll having their ends pivoted to the machine, means for radially adjusting the cutting rolls, resilient means for holding the cutting rolls in their adjusted positions, and means for inserting and compressing flux material in the longitudinal grooves.

15. A machine for manufacturing flux carrying welding rod electrodes in a continuous operation, a centering sleeve having a guideway formed therein adapted to guide the rod as it is advanced through the machine, a spider slidably mounted on one end of the centering sleeve, a cruciform support mounted on the opposite end of the centering sleeve, a plurality of pairs of links having their ends pivotally connected to the spider and the cruciform support, axles having their opposite ends supported in each pair of links, a cutting roll mounted on the axles between each pair of links, means for radially adjusting the cutting rolls, and means for inserting and compressing flux material in the longitudinal grooves.

16. A machine for manufacturing flux carrying welding rod electrodes in a continuous operation, comprising a centering sleeve, a tubular guideway extending through the centering sleeve adapted to guide the rod as it is advanced through the machine, slots extending through the centering sleeve at an intermediate point, cutting rolls extending into the slots for penetrating the rod thereby extruding the metal to form longitudinal grooves therein, means for simultaneously throwing the cutting rolls into or out of engagement with the rod, a flux box containing flux material through which the grooved rod passes to receive flux material in the longitudinal grooves, and a drawing die adapted to compress the flux material in the longitudinal grooves and reduce the cross sectional area of the rod.

17. A machine for manufacturing flux carrying welding rod electrodes in a continuous operation having a plurality of longitudinally extending V-shaped grooves formed therein around the periphery of said electrode with flux material within said longitudinal grooves, comprising a plurality of pairs of coacting cutting rolls for grooving the rod, means for simultaneously throwing the cutting rolls into or out of engagement with the rod, a flux box containing flux material through which the grooved rod passes to receive flux material in the longitudinal grooves, and a drawing die adapted to compress the flux material in the longitudinal grooves and reduce the cross sectional area of the rod.

18. A machine for manufacturing flux carrying welding rod electrodes in a continuous operation having a plurality of equi-spaced longitudinally extending grooves formed therein around the periphery of the electrode with flux material firmly held within said longitudinal grooves, comprising a plurality of pairs of oppositely disposed cutting rolls adapted to extrude the metal and form longitudinal grooves in the rod as it is advanced through the machine, means for radially adjusting the cutting rolls, means for simultaneously throwing the cutting rolls into or out of cutting engagement with the rod, a flux box provided with flux material through which the rod is passed, and a drawing die for compressing the flux material in the grooves and reducing the cross sectional area of the rod.

19. A machine for manufacturing flux carrying welding rod electrodes in a continuous operation, comprising oppositely disposed cutting rolls pivotally attached to the machine adapted to form longitudinal grooves in the rod as it is continuously advanced through the machine, means for simultaneously throwing the cutting rolls into or out of cutting engagement with the rod, a flux box containing flux material through which the rod is passed to receive flux material in the grooves, and a drawing die for compressing the flux material in the longitudinal grooves and smooth the outer surface of the rod.

20. A machine for manufacturing flux carrying welding rod electrodes in a continuous operation, comprising a centering sleeve having a guideway formed therein through which the rod is advanced, transverse slots formed at an intermediate point through the centering sleeve, a spider slidably mounted on one end of the centering sleeve, a support having radially extending arms mounted on the opposite end of the centering sleeve, cutting rolls extending into the transverse slots in the centering sleeve, links for supporting the cutting rolls having their ends pivotally attached to the spider and the radially extending arms, means for adjusting the cutting rolls to vary the depth of the groove cut in the rod, a flux box containing flux material secured to the centering sleeve through which the rod is advanced to receive flux material in the longitudinal grooves, and a drawing die adapted to compress the flux material in the longitudinal grooves and reduce the cross sectional area of the bar.

21. A machine for manufacturing flux carrying welding rod electrodes in a continuous operation, comprising a plurality of oppositely aligned coacting cutting rolls for longitudinally grooving the rod, a movable support for the cutting rolls, a flux box connected to the support for the cutting rolls containing flux material through which the rod thus formed is passed, and a drawing die connected to the flux box adapted to compress the flux material in the longitudinal grooves and reduce the cross sectional area of the rod.

22. A machine for manufacturing flux carrying welding rod electrodes in a continuous operation, cutting rolls for longitudinally grooving the rod on diametrically opposite surfaces, links having their opposite ends pivotally connected to the machine for supporting the cutting rolls, means for radially adjusting the pivoted outer ends of the supporting links for the cutting rolls, means for simultaneously radially swinging the pivoted inner ends of said supporting links, a flux box containing flux material through which the rod is passed to receive flux material in the grooves, and a drawing die adapted to compress the flux material in the longitudinal grooves and smooth the outer surface of the rod.

23. A machine for manufacturing flux carrying welding rod electrodes in a continuous operation, comprising cutting rolls adapted to form longitudinal grooves in diametrically opposite surfaces of the rod, a pair of supporting links for each cutting roll, an axle for each cutting roll having their ends supported at intermediate points in the pair of links, means for radially adjusting the ends of the supporting links for the cutting rolls, means for simultaneously throwing the cutting rolls into or out of engagement with the rod, a flux box containing flux material through which the grooved rod is passed to receive flux material in the grooves, and means for compressing the flux material in the longitudinal grooves and smooth the outer surface of the rod.

24. A machine for manufacturing flux carrying welding rod electrodes in a continuous operation, comprising means for guiding the rod as it is advanced through the machine, a plurality of pairs of coacting cutting rolls adapted to longitudinally groove the rod on diametrically opposite surfaces, means for radially adjusting the cutting rolls, resilient means for holding the cutting rolls in relatively fixed relation after adjustment, a flux box containing flux material through which the grooved rod passes whereby flux material will be supplied to the grooves, and a drawing die adapted to compress the flux material in the longitudinal grooves and smooth the outer surface of the rod.

25. A machine for manufacturing flux carrying welding rod electrodes, comprising a centering sleeve having means for guiding the rod as it is advanced through the machine, transversely extending slots formed in the intermediate portion of the centering sleeve, a spider mounted on one end of the centering sleeve, a support having radial arms mounted on the opposite end of the centering sleeve to that of the spider, a plurality of pairs of links having their ends pivotally connected to the spider and the radial arms of the support, an axle having its ends mounted in the intermediate portions of each pair of links, a cutting roll mounted on each axle between said pairs of links and extending into the transversely extending slots formed in the centering sleeve adapted to groove the advancing rod, means for radially adjusting the cutting rolls, a flux box containing flux material through which the grooved rod is passed whereby flux material will be supplied to the grooves, and a drawing die adapted to compress the flux material in the longitudinal grooves and smooth the outer surface of the rod.

26. A machine for manufacturing flux carrying welding rod electrodes in a continuous operation, comprising a centering sleeve having a guideway for the rod as it is advanced through the machine, oppositely disposed transverse slots formed in the intermediate portion of the centering sleeve, means mounted on the opposite ends of the centering sleeve for pivotally supporting the ends of a plurality of pairs of links, an axle having its ends supported by the intermediate portion of each pair of links, a cutting roll mounted on each axle between each pair of said links and projecting into the transverse slots formed in the centering sleeve adapted to groove the rod as it is advanced through the machine, a flux box containing flux material through which the grooved rod passes to receive the flux material in the longitudinal grooves, and a drawing die adapted to compress the flux material and smooth the outer surface of the rod.

27. A machine for manufacturing flux carrying welding rod electrodes in a continuous operation, comprising means for guiding the rod as it is advanced through the machine, a cutting roll adapted to longitudinally groove the rod, supporting means for the cutting roll adapted by longitudinal movement to radially throw the cutting roll into or out of engagement with the rod, means for supplying flux material to the longitudinal groove, and a drawing die adapted to compress the flux material in the longitudinal groove and smooth the outer surface of the rod.

28. A machine for manufacturing flux carrying welding rod electrodes, comprising means for guiding the rod as it is advanced through the machine, a pair of spaced links connected together at an intermediate point by an axle, a cutting roll mounted on the axle between the spaced links adapted to longitudinally groove the rod, a vertically adjustable block for pivotally supporting one end of the pair of spaced links, a spider pivotally connected to the opposite ends of the spaced links for supporting the cutting roll, said spider being slidably movable to radially swing the cutting roll into or out of engagement with the rod, a flux box containing flux material through which the grooved rod is passed to receive flux material in the longitudinal groove, and a drawing die adapted to compress the flux material in the longitudinal groove and smooth the outer surface of the rod.

29. A machine for manufacturing flux carrying welding rod electrodes in a continuous operation, comprising means for guiding the rod as it is advanced through the machine, a plurality of cutting rolls adapted to form longitudinal grooves in the rod, a sliding spider adapted to throw the cutting rolls into or out of engagement with the rod, a flux box containing flux material through which the rod is advanced to receive flux material in the longitudinal grooves, and a drawing die adapted to compress the flux material in the longitudinal grooves and smooth the outer surface of the rod.

30. A machine for manufacturing flux carrying welding rod electrodes, comprising means for guiding the rod as it is advanced through the machine, a plurality of pairs of cutting rolls arranged in opposed relation adapted to form longitudinally extending grooves in the diametrically opposite surface of the rod, means for radially adjusting the cutting rolls, means for introducing flux material into the grooves, and a drawing die adapted to compress the flux material in the grooves and smooth the outer surface of the rod.

31. A machine for manufacturing flux carrying welding rod electrodes, comprising means for guiding the rod as it is advanced through the machine, a plurality of cutting rolls arranged in aligned opposed relation adapted to be rotated by the advancing rod and form longitudinally extending grooves in the peripheral surface of the rod, a pair of spaced links having their ends pivotally connected to the machine for supporting each cutting roll, a flux box containing flux material through which the rod is passed for introducing flux material into the longitudinal grooves, and a drawing die adapted to compress the flux material in the grooves and smooth the outer surface of the rod.

32. A machine for manufacturing flux carrying welding rod electrodes, comprising a centering sleeve having guideways formed therein adapted to guide the rod as it is advanced through the machine, transverse slots formed in the intermediate portion of the centering sleeve, a support having radial arms mounted on the outer end of the centering sleeve, a spider having an outwardly projecting tubular extension and an inwardly extending boss with a socket formed therein mounted on the inner end of the centering sleeve, a plurality of pairs of spaced links each connected together at an intermediate point by an axle, ears on the forward surface of the spider pivotally connected to the inner ends of the spaced links, a cutting roll extending into the transverse slots in the centering sleeve mounted on each axle between the spaced links adapted to longitudinally groove the rod as it travels through the machine, an adjustable block mounted on each radial arm support pivotally connected to the outer ends of each pair of spaced links, a flux box secured to the inner end of the centering sleeve containing flux material through which the rod passes whereby flux material will be supplied to the longitudinal grooves, and a drawing die adapted to compress the flux material in the grooves and smooth the outer surface of the rod.

33. A machine for manufacturing flux carrying welding rod electrodes, comprising cutting rolls for longitudinally grooving a rod as it is advanced through the machine, sliding means for swinging the cutting rolls into or out of engagement with the rod, a flux containing receptacle through which the rod passes whereby flux material will be supplied to the grooves, and a drawing die adapted to compress the flux material and partially close the grooves about said flux material.

34. A machine for manufacturing flux carrying welding rod electrodes in a continuous operation, a centering sleeve having a guideway formed therein adapted to guide the rod as it is advanced through the machine, a spider slidably mounted on one end of the centering sleeve, a support having radially extending arms and a square central portion mounted on the opposite end of the centering sleeve, an adjustable block mounted on each radially extending arm, a plurality of cutting rolls adapted to longitudinally groove the rod in its travel through the machine, an axle having its bearings located centrally in a pair of spaced links for supporting each cutting roll, a pivotal link connection between one end of each pair of said links and the spider, a pivotal connection between the opposite end of each pair of links and the adjustable block mounted on each radially extending arm of the support, an adjusting nut threaded on each radially extending arm for limiting the movement of the adjustable blocks in one direction, resilient means secured to one end of the spaced links and engaging the square central portion of the support for holding the adjustable blocks against the nuts, a flux box secured to the centering sleeve containing flux material through which the rod passes whereby flux material will be supplied in the grooves, and a drawing die secured to the flux box adapted to compress the flux material in the grooves and smooth the outer surface of the rod.

35. A machine for manufacturing flux carrying welding rod electrodes in a continuous operation, comprising a centering sleeve having guideways formed therein through which the rod is advanced, slots formed at an intermediate point through the centering sleeve, a support keyed to the outer end of the centering sleeve having radially extending arms, a spider having an outwardly tubular extension and an inwardly extending boss formed with a socket slidably mounted on the inner end of the centering sleeve, cutting rolls for longitudinally grooving the rod on diametrically opposite surfaces, links having their opposite ends pivotally connected to the radially extending arms of the support and the spider, a flux box containing flux material through which the rod passes to receive flux material in the grooves, said flux box having its outer end extending into the socket of the boss and keyed therein and rigidly secured to the inner end of the centering sleeve, and a drawing die secured to the inner end of the flux box adapted to compress the flux material in the longitudinal grooves and smooth the outer surface of the rod.

36. A machine for manufacturing flux carrying welding rod electrodes, comprising a drawing bench adapted to draw the rod through the machine, a support to which the machine is pivotally secured, cutting rolls for longitudinally grooving the rod adapted to extrude the metal in forming the grooves as it is advanced through the machine, means for simultaneously swinging the cutting rolls into or out of engagement with the rod, a flux containing receptacle through which the rod passes whereby flux material will be supplied to the grooves, and a drawing die adapted to compress the flux material and smooth the outer surface of the rod.

HARRY R. GEER.